(12) United States Patent
Kinoshita

(10) Patent No.: US 9,031,309 B2
(45) Date of Patent: May 12, 2015

(54) RECORDING MEDIA PROCESSING DEVICE, CONTROL METHOD OF A RECORDING MEDIA PROCESSING DEVICE, AND STORAGE MEDIUM

(71) Applicant: Seiko Epson Corporation, Tokyo (JP)

(72) Inventor: Yoshiaki Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 13/915,973

(22) Filed: Jun. 12, 2013

(65) Prior Publication Data

US 2013/0329984 A1 Dec. 12, 2013

(30) Foreign Application Priority Data

Jun. 12, 2012 (JP) ................. 2012-132653

(51) Int. Cl.
*G06K 9/00* (2006.01)
*G06K 9/03* (2006.01)
*G06K 9/18* (2006.01)
*G06K 9/20* (2006.01)

(52) U.S. Cl.
CPC ..................... *G06K 9/186* (2013.01)

(58) Field of Classification Search
CPC ......... G06K 9/186; G06K 9/036; G06K 9/03; G06K 2017/0038; G06K 9/522; G06K 9/72
USPC ......................................... 382/139
See application file for complete search history.

(56) References Cited

U.S. PATENT DOCUMENTS

2010/0014744 A1* 1/2010 Inaba ........................... 382/140

FOREIGN PATENT DOCUMENTS

JP 2004-206362 A 7/2004

* cited by examiner

*Primary Examiner* — Amir Alavi
*Assistant Examiner* — Kenny Cese
(74) *Attorney, Agent, or Firm* — Nutter McClennen & Fish LLP; John J. Penny, Jr.

(57) ABSTRACT

The recognition rate is improved and recognition errors are suppressed when recognizing magnetic ink characters. A character recognition unit calculates a total difference by calculating the total of the differences between the character waveform data and the reference waveform data for each magnetic ink character within the area of one character; calculates a partial difference by summing the differences between character waveform data and reference waveform data in a target area, which is the area corresponding to a stroke that is 2 mesh or more wide in the area of one character; executing a correction process that reduces the value of the partial difference; and recognizing the candidate character as the magnetic ink character that was read when the total difference after the correction process is less than or equal to a threshold value.

12 Claims, 11 Drawing Sheets

BOLD LINE ··· REFERENCE WAVEFORM DATA
THIN LINE ··· CHARACTER WAVEFORM DATA

| CHARACTER | CORRECTION PROCESS | TARGET AREA | |
|---|---|---|---|
| 1 | 1, 2 | 16 ~ 22 | |
| | 3, 4 | 16 ~ 22 | |
| 4 | 1, 2 | 16 ~ 22 | 44 ~ 50 |
| | 3, 4 | 16 ~ 21 | 44 ~ 49 |
| T | 1, 2 | 16 ~ 29 | 51 ~ 57 |
| | 3, 4 | 16 ~ 28 | 52 ~ 56 |
| A | 1, 2 | 16 ~ 22 | 51 ~ 57 |
| | 3, 4 | 16 ~ 20 | 53 ~ 57 |
| O | 1, 2 | 16 ~ 29 | |
| | 3, 4 | 16 ~ 28 | |
| D | 1, 2 | 30 ~ 36 | 51 ~ 57 |
| | 3, 4 | 31 ~ 35 | 52 ~ 56 |

FIG. 11

RECORDING MEDIA PROCESSING DEVICE, CONTROL METHOD OF A RECORDING MEDIA PROCESSING DEVICE, AND STORAGE MEDIUM

Priority is claimed under 35 U.S.C. §119 to Japanese Application nos. 2012-132653 filed on Jun. 12, 2012 which is hereby incorporated by reference in their entirety.

BACKGROUND

1. Technical Field

The present invention relates to a recording media processing device, a method of controlling a recording media processing device, and a storage medium storing a program.

2. Related Art

Recording media processing devices (check readers) that have a magnetic head for reading a magnetic ink character line (MICR line) recorded on checks and similar recording media, read the magnetic ink characters contained in the MICR line of the recording medium conveyed through a conveyance path, and recognize each magnetic ink character are known from the literature. See, for example, Japanese Unexamined Patent Appl. Pub. JP-A-2004-206362.

Such recording media processing devices identify (read) each character in the MICR line by magnetic ink character recognition, a process of extracting character waveform data in a range corresponding to one magnetic ink character from the signal waveform data obtained by reading the MICR line, and comparing the difference between the extracted character waveform data and reference waveform data defined by a particular standard for the characters to recognize each magnetic ink character.

Some magnetic ink character sets include characters that have vertical lines (strokes) with a line width twice or more the width of the thinnest strokes. Waveform distortion (the distance from the reference waveform data) can occur in the character waveform data acquired by magnetically reading a magnetic ink character containing such a thick stroke due, for example, to the effects of printing. When waveform distortion occurs in the character waveform data, the difference with the reference waveform data increases where distortion occurs, character recognition is not possible and the recognition rate drops, or the character may be mistakenly recognized as a different character.

SUMMARY

The present invention is directed to solving at least part of the foregoing problem, and provides a recording media processing device, control method, and storage medium as described below.

A recording media processing device according to one aspect of the invention has a magnetic reading unit that magnetically reads a magnetic ink character recorded on a recording medium; and a character recognition unit that recognizes the read magnetic ink character based on a comparison of reference waveform data and character waveform data acquired by the magnetic reading unit reading the magnetic ink character. The character recognition unit calculates a total difference for each character by summing the differences between the character waveform data and the reference waveform data for each magnetic ink character within the area of one character, and selects the character with the smallest total difference as a candidate character for the read magnetic ink character; calculates a partial difference by calculating the sum of differences between the character waveform data and the reference waveform data in a target area within the area of one character, the target area corresponding to the stroke of the specific width or more in the magnetic ink character corresponding to the candidate character, and executes a correction process that reduces the partial difference portion of the total difference to the candidate character to less than the calculated value, when the magnetic ink character corresponding to the candidate character includes a stroke of a specific width or more; and when the total difference after the correction process is less than or equal to a first threshold, recognizes the candidate character as the character represented by the magnetic ink character that was read.

When the magnetic ink character corresponding to the candidate character has a stroke of a specific width or greater, this aspect of the invention executes a correction process that reduces the value of the partial difference of a target area corresponding to the stroke of the specific width, the partial difference being a portion of the total difference to the candidate character. As a result, when waveform distortion occurs in the target area of the acquired character waveform data due to printing effects, and the difference between the character waveform data and the reference waveform data is greater than normal, the total difference that is greater than normal can be reduced and the effect of waveform distortion reduced. Because the candidate character is recognized as the character represented by the magnetic ink character when the total difference after the correction process is less than or equal to a first threshold, the effect of waveform distortion on character recognition can also be reduced and the recognition rate improved.

In a recording media processing device according to another aspect of the invention, the character recognition unit preferably executes the correction process when a value of the character waveform data is positive and is greater than the corresponding value of the reference waveform data for the candidate character in the target area.

When a value of the character waveform data in the target area is positive (the direction of the first peak that appears when a magnetic ink character is read) and is greater than the corresponding value of the reference waveform data for the candidate character, there is a strong possibility that the value of the character waveform data is greater than normal due to waveform distortion. Because the correction process is executed in this event, the recognition rate can be further improved.

In a recording media processing device according to another aspect of the invention, the character recognition unit preferably executes the correction process when the total difference before the correction process is less than or equal to a second threshold.

If the total difference is significantly greater than usual, the difference between the character waveform data and the reference waveform data is great and the likelihood of successful recognition is low even if the correction process is applied. If the correction process is applied in this event, the magnetic ink character could even be mistakenly recognized as a different character. This aspect of the invention compares the total difference before the correction process with a second threshold value, does not execute the correction process if the total difference is greater than the second threshold, and can therefore prevent executing the correction process when improving the recognition rate cannot be expected.

In a recording media processing device according to another aspect of the invention, the character recognition unit preferably replaces the value of the calculated partial difference with the product of the calculated partial difference times ½ in the correction process.

The possibility of successful recognition increases by reducing the total difference in the correction process, but this can also increase the possibility of mistakenly recognizing a wrong character. By making the value of the partial difference in the target area approximately ½ the value before correction, the total difference is prevented from becoming too small, and mistaken recognition can be suppressed while improving the recognition rate.

In a recording media processing device according to another aspect of the invention, the character recognition unit preferably compares the total difference after the correction process with the first threshold when the difference between the total difference before the correction process and the total difference after the correction process is less than or equal to a specific value.

If the correction process is applied even though character recognition is not affected by waveform distortion, the total difference will become too small. Therefore, if the total difference after the correction process becomes significantly lower than before the correction process, there is a strong possibility that the candidate character is wrong. However, when the difference between the total difference before the correction process and the total difference after the correction process exceeds a specific value, this aspect of the invention does not compare the total difference with the first threshold, or more specifically ends the recognition process, and can therefore suppress recognition errors.

In a recording media processing device according to another aspect of the invention, the second threshold is preferably the sum of the first threshold and the specific value.

This aspect of the invention uses the sum of the first threshold for character recognition plus a specific value for comparing the total difference after the correction process with the first threshold as the second threshold for determining whether or not to execute the correction process, and can therefore appropriately determine whether to execute the correction process by suitably setting the specific value.

Another aspect of the invention is a control method of a recording media processing device including a magnetic reading unit that magnetically reads a magnetic ink character recorded on a recording medium, and a character recognition unit that recognizes the read magnetic ink character based on a comparison of reference waveform data and character waveform data acquired by the magnetic reading unit reading the magnetic ink character, the control method including steps of: calculating a total difference for each character by summing the differences between the character waveform data and the reference waveform data for each magnetic ink character within the area of one character, and selecting the character with the smallest total difference as a candidate character for the read magnetic ink character; calculating a partial difference by calculating the sum of differences between the character waveform data and the reference waveform data in a target area within the area of one character, the target area corresponding to the stroke of the specific width or more in the magnetic ink character corresponding to the candidate character, and executing a correction process that reduces the partial difference portion of the total difference to the candidate character to less than the calculated value, when the magnetic ink character corresponding to the candidate character includes a stroke of a specific width or more; and recognizing the candidate character as the character represented by the magnetic ink character that was read when the total difference after the correction process is less than or equal to a first threshold.

When the magnetic ink character corresponding to the candidate character has a stroke of a specific width or greater, this method of the invention executes a correction process that reduces the value of the partial difference of a target area corresponding to the stroke of the specific width, the partial difference being a portion of the total difference to the candidate character. As a result, when waveform distortion occurs in a stroke of the specific width or greater in the acquired character waveform data due to printing effects, and the difference between the character waveform data and the reference waveform data is greater than normal, the total difference that is greater than normal can be reduced and the effect of waveform distortion reduced. Because the candidate character is recognized (confirmed) as the character represented by the magnetic ink character when the total difference after the correction process is less than or equal to a first threshold, the effect of waveform distortion on character recognition can also be reduced and the recognition rate improved.

Another aspect of the invention is a computer-readable storage medium storing a program executed by a control unit that controls parts of a recording media processing device including a magnetic reading unit that magnetically reads a magnetic ink character recorded on a recording medium, and a character recognition unit that recognizes the read magnetic ink character based on a comparison of reference waveform data and character waveform data acquired by the magnetic reading unit reading the magnetic ink character, the program causing the control unit to execute steps of: calculating a total difference for each character by summing the differences between the character waveform data and the reference waveform data for each magnetic ink character within the area of one character, and selecting the character with the smallest total difference as a candidate character for the read magnetic ink character; calculating a partial difference by calculating the sum of differences between the character waveform data and the reference waveform data in a target area within the area of one character, the target area corresponding to the stroke of the specific width or more in the magnetic ink character corresponding to the candidate character, and executing a correction process that reduces the partial difference portion of the total difference to the candidate character to less than the calculated value, when the magnetic ink character corresponding to the candidate character includes a stroke of a specific width or more; and recognizing the candidate character as the character represented by the magnetic ink character that was read when the total difference after the correction process is less than or equal to a first threshold.

When the magnetic ink character corresponding to the candidate character has a stroke of a specific width or greater, the program according to this aspect of the invention executes a correction process that reduces the value of the partial difference of a target area corresponding to the stroke of the specific width, the partial difference being a portion of the total difference to the candidate character. As a result, when waveform distortion occurs in a stroke of the specific width or greater in the acquired character waveform data due to printing effects, and the difference between the character waveform data and the reference waveform data is greater than normal, the total difference that is greater than normal can be reduced and the effect of waveform distortion reduced. Because the candidate character is recognized (confirmed) as the character represented by the magnetic ink character when the total difference after the correction process is less than or equal to a first threshold, the effect of waveform distortion on character recognition can also be reduced and the recognition rate improved.

Other objects and attainments together with a fuller understanding of the invention will become apparent and appreci-

BRIEF DESCRIPTION OF THE DRAWINGS

FIG. 11 is a table showing target ranges for the difference correction process.

DESCRIPTION OF EMBODIMENTS

Preferred embodiments of a recording media processing device and a method of controlling the recording media processing device according to the present invention are described below with reference to the accompanying figures. A recording media processing device according to this embodiment of the invention is a device that recognizes a string of magnetic ink characters printed on the MICR line of a recording medium in order to verify the validity of the recording medium, which in this embodiment is a business or personal check.

Checks and Magnetic Ink Characters

A check 4 used as an example of the recording medium in this embodiment, and magnetic ink characters 101, are described first.

Figure 1A:
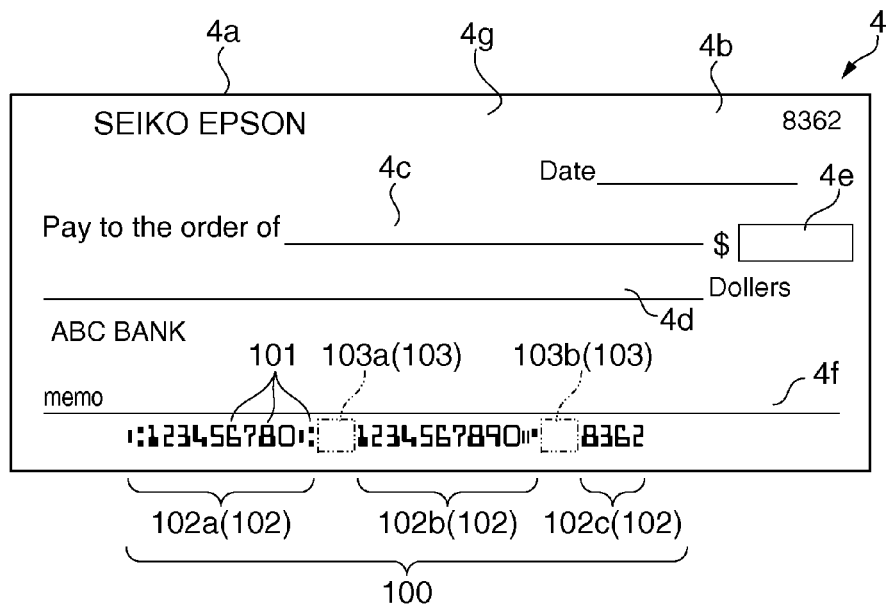
FIGS. 1A-1D show a check on which a MICR line is printed.
Figure 1B:
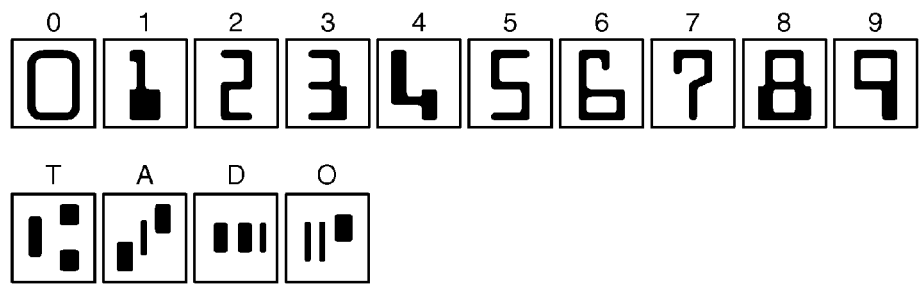
Figure 1C:
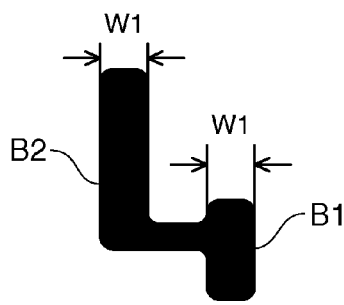
Figure 1D:
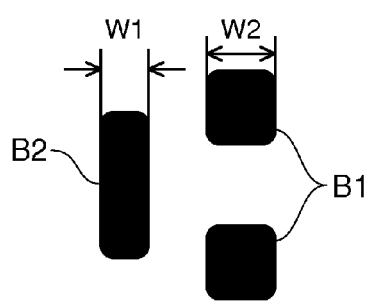

FIGS. 1A-1D show an example of a check and magnetic ink characters. More specifically, FIG. 1A shows an example of a check, FIG. 1B shows the characters in the E-13B MICR font. FIG. 1C shows the number 4 and FIG. 1D shows the transit symbol T in the E-13B MICR font enlarged.

As shown in FIG. 1A, the check 4 has a date field 4b, payee field 4c, amount fields 4d and 4e, and a signature line 4f on the front 4g of the check form 4a. The check form 4a is a cut-sheet medium. Note that fields 4b to 4f are still empty in FIG. 1A. An MICR line 100 containing multiple magnetic ink characters 101 expressing the bank number, account number, and check number is printed along the bottom of the check form 4a. An endorsement area is provided on the back 4h of the check 4 (see FIG. 2).

The MICR line 100 includes plural fields 102 (102a, 102b, 102c) delimited by space characters 103 (103a, 103b). Each of the fields 102a, 102b, 102c is a continuous string of magnetic ink characters 101, and in this example correspond from the left to the bank number, account number, and check number.

As indicated by the imaginary lines in FIG. 1A, a space character 103a is placed between fields 102a and 102b, and a space character 103b is placed between fields 102b and 102c. These space characters 103 (103a, 103b) are recognized as space characters by the check reader 1. The space characters 103 (103a, 103b) may also occupy the width of one or multiple magnetic ink characters 101.

The magnetic ink characters 101 are characters magnetically printed on the check 4 using a specific font (such as the E-13B font), and one magnetic ink character 101 corresponds to one of plural predefined characters.

As shown in FIG. 1B, the E-13B font consists of 14 shapes corresponding to the shapes of the magnetic ink characters 101. These 14 shapes include the 10 numbers 0 to 9, and four special symbols, a transit symbol T, an amount symbol A, a dash symbol D, and an On-Us symbol O.

The MICR line 100 may be printed on the check 4 by offset printing or laser printing process. The actual shapes of the magnetic ink characters 101 in the E-13B font produced by offset printing, and the magnetic ink characters 101 in the E-13B font produced by laser printing, may differ.

A vertical line in any character of the E-13B font is called a stroke. The line width of a stroke in the characters of the E-13B font may be 1 mesh, 2 mesh, or 3 mesh. A line width of 2 mesh is the "specific width" in this embodiment of the invention. A "mesh" is described further below.

For example, the number 4 shown enlarged in FIG. 1C has a first stroke B1 and a second stroke B2. The line width W1 of the first stroke B1 and the second stroke B2 in the number 4 is 2 mesh. The transit symbol T shown enlarged in FIG. 1D has a pair of first strokes B1 and a second stroke B2. The line width W2 of the first strokes B1 in the transit symbol T is 3 mesh, and is greater than the line width W1 of the second stroke B2. The number 4 and the transit symbol T therefore each have a stroke with a line width greater than or equal to the specific width of 2 mesh.

Recording Media Processing Device

A recording media processing device according to this embodiment of the invention is described next. A recording media processing device according to this embodiment of the invention includes a check reader 1 and host computer 70.

Figure 2:
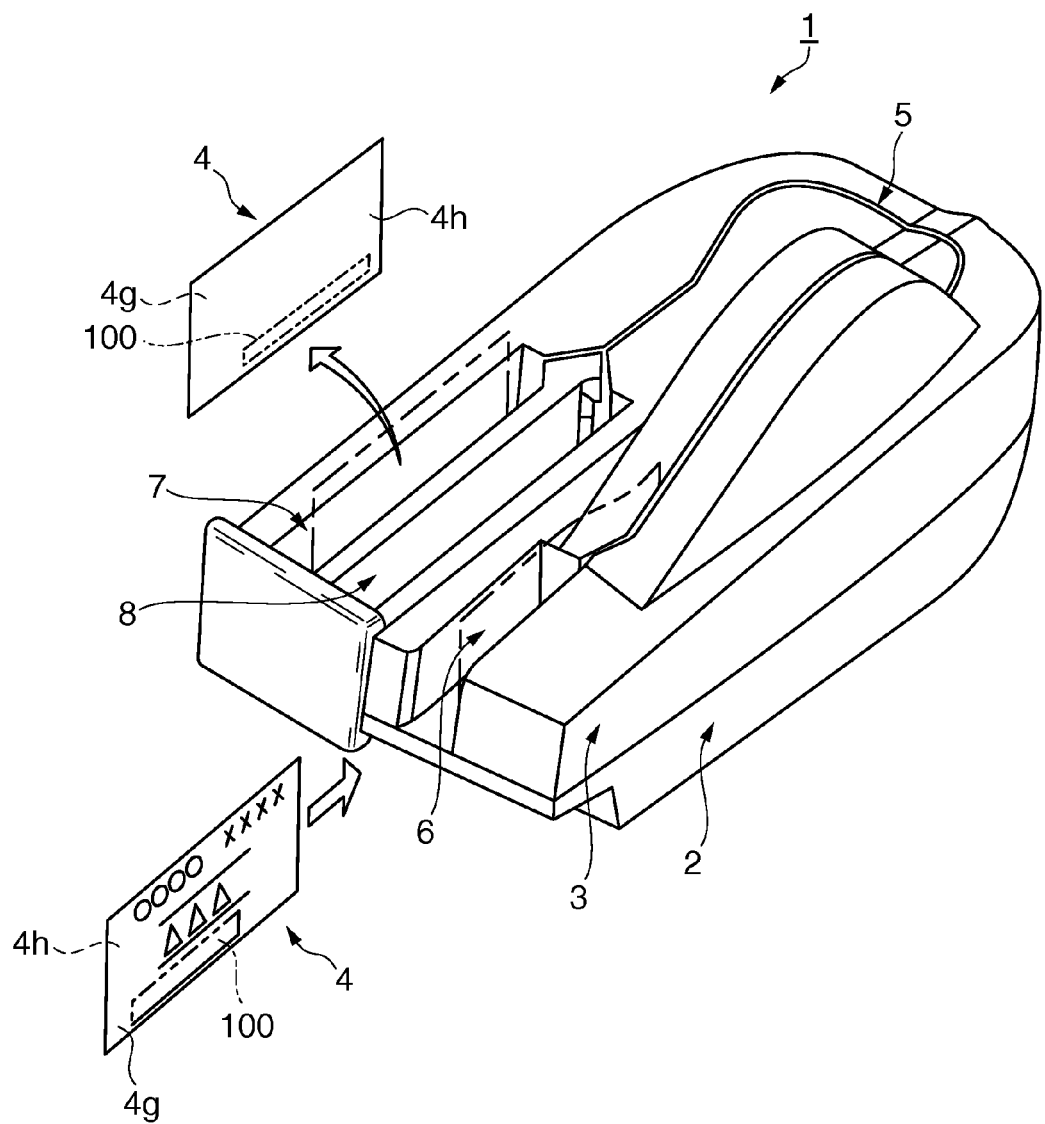
FIG. 2 is an oblique view of a check reader according to a preferred embodiment of the invention.

The basic configuration of a check reader 1 according to this embodiment of the invention is described first. FIG. 2 is an oblique view of the check reader 1 according to this embodiment of the invention. The check reader 1 is a device that processes checks 4, including reading magnetic ink characters recorded on a check 4, scanning both sides of the check 4, and recording a specific image in the endorsement area of the check 4.

The check reader 1 has a bottom case 2, and a cover case 3 covering the top of the bottom case 2, and other components assembled inside. A check 4 conveyance path 5 is formed inside the cover case 3 as a narrow vertical channel that is U-shaped when seen from above. One end of the conveyance path 5 communicates with a check supply unit 6 formed as a wide vertical hopper, and the other end of the conveyance path 5 splits left and right into first check discharge unit 7 and second check discharge unit 8, both of which are also wide vertical pockets.

Checks 4 are inserted to the check supply unit 6 with the top and bottom edges aligned so that the top edges (up in FIG. 1A) are up and the bottom edges (down in FIG. 1A) down, and the front and back sides matched so that the front 4g faces the outside of the U-shaped conveyance path 5 (as shown in FIG. 2). The checks 4 inserted to the check supply unit 6 are conveyed through the conveyance path 5 with the right edge shown in FIG. 1A as the leading end.

As a check 4 fed from the check supply unit 6 is conveyed through the conveyance path 5, a front image, which is an image of the front 4g, and a back image, which is an image of the back 4h, are scanned, and the MICR line 100 recorded on the front 4g is magnetically read. Checks 4 from which the MICR line 100 is successfully read are then discharged into the first check discharge unit 7 after a specific endorsement image is recorded thereon.

Checks 4 from which reading the MICR line 100 failed are then discharged into the second check discharge unit 8 without recording the specific endorsement image. A check 4 discharged into the second check discharge unit 8 may then be examined to determine why reading failed, or scanned again, for example.

Figure 3:
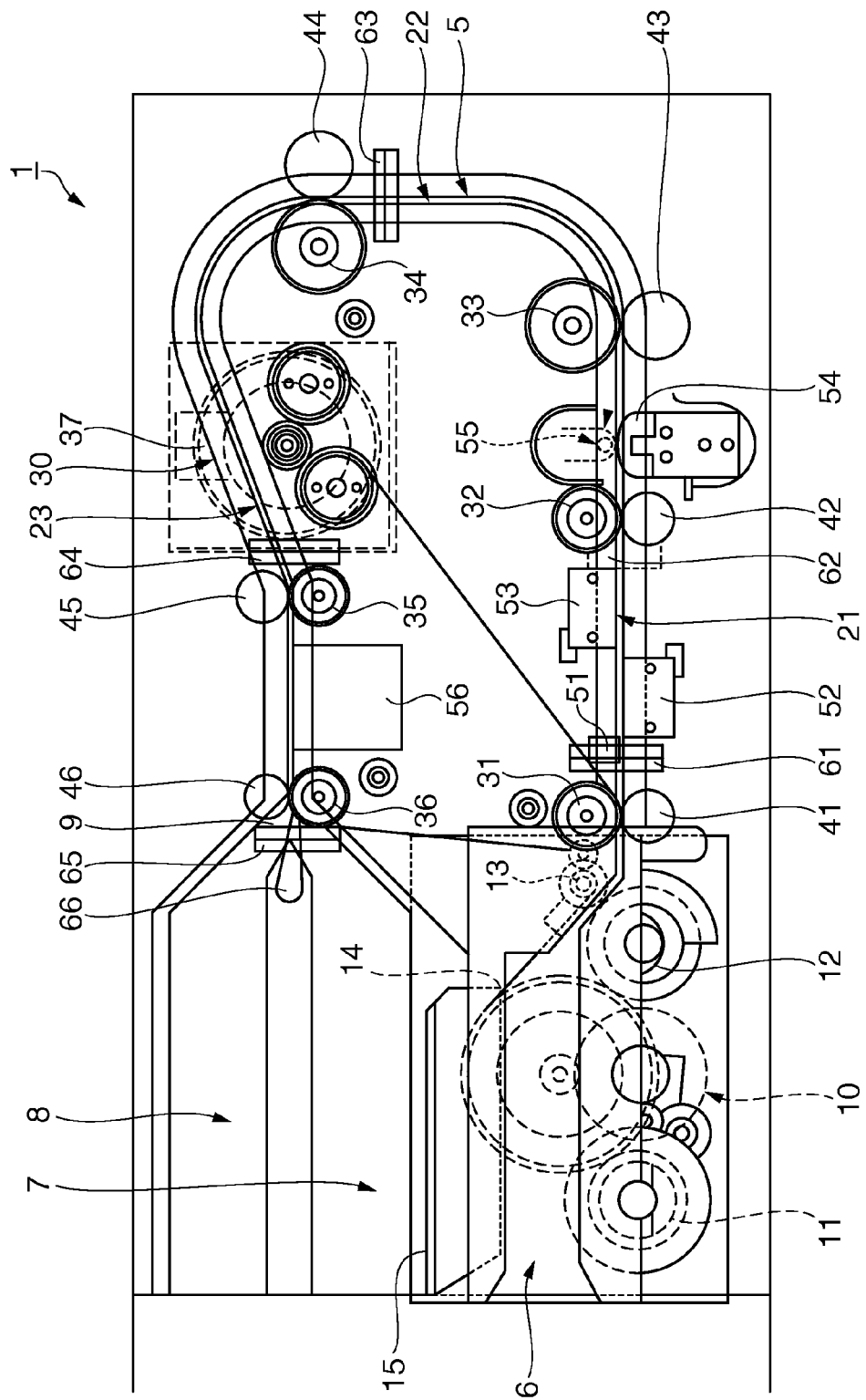
FIG. 3 shows the internal structure of the check reader.

FIG. 3 shows the internal configuration of the check reader 1. The check supply unit 6 has a check feed mechanism 10 for feeding checks 4 (see FIG. 2) into the conveyance path 5. The check feed mechanism 10 includes a delivery roller 11, a feed roller 12, a retard roller 13 pressed against the feed roller 12, a paper feed motor 14, and a check-pressing hopper 15.

When the paper feed motor 14 drives, the checks 4 loaded in the check supply unit 6 are pressed by the check-pressing hopper 15 to the delivery roller 11 side, and the delivery roller 11 and feed roller 12 are then driven synchronously.

The check 4 is then fed between the feed roller 12 and retard roller 13 by the delivery roller 11. A specific rotational load is applied to the retard roller 13, and only the one check 4 directly contacting the feed roller 12 is separated from the other checks 4 and fed into the conveyance path 5.

The conveyance path 5 is U-shaped as described above, and has a straight upstream conveyance path portion 21 connected to the check supply unit 6, a downstream conveyance path portion 23 that curves slightly and connects to the first check discharge unit 7 and second check discharge unit 8, and a curved conveyance path portion 22 that connects the upstream conveyance path portion 21 and downstream conveyance path portion 23.

A check conveyance mechanism 30 conveys checks 4 fed into the conveyance path 5 from the check supply unit 6 through the conveyance path 5. The check conveyance mechanism 30 includes first to sixth conveyance rollers 31 to 36, first to sixth pressure rollers 41 to 46 that are pressed against and rotate in unison with the opposing conveyance rollers, and a conveyance motor 37 that rotationally drives the first to sixth conveyance rollers 31 to 36.

The first to sixth conveyance rollers 31 to 36 rotate synchronously. A stepper motor, for example, is used as the conveyance motor 37. The conveyance distance of a check 4 can therefore be known from the number of steps the stepper motor is driven.

The first to third conveyance rollers 31 to 33 are respectively disposed at the upstream end and middle of the upstream conveyance path portion 21, and at the junction to the curved conveyance path portion 22. The fourth conveyance roller 34 is disposed to the downstream end of the curved conveyance path portion 22. The fifth and sixth conveyance rollers 35, 36 are respectively disposed in the middle and downstream end of the downstream conveyance path portion 23.

A magnet 51 for magnetizing magnetic ink characters, a front contact image sensor 52, and a back contact image sensor 53 are disposed in order from the upstream end of the upstream conveyance path portion 21 between the first conveyance roller 31 and second conveyance roller 32. The MICR line 100 recorded on a check 4 is magnetized by the magnet 51.

The front contact image sensor 52 faces the front 4g of the check 4 conveyed through the conveyance path 5, and scans a front image, which is an image of the front 4g. The back contact image sensor 53 faces the back 4h of the check 4 conveyed through the conveyance path 5, and scans a back image, which is an image of the back 4h.

A magnetic head 54 is disposed between the second conveyance roller 32 and third conveyance roller 33 as a magnetic reading unit that reads the magnetic ink characters 101. The magnetic head 54 magnetically reads the MICR line 100 by detecting change in the magnetic flux density of the magnetized MICR line 100 at a specific sampling period to acquire signal waveform data.

A pressure plate 55 that presses the check 4 against the magnetic head 54 is disposed opposite the head. A recording device 56 for recording a specific endorsement image is disposed to the downstream conveyance path portion 23 between the fifth conveyance roller 35 and sixth conveyance roller 36. The recording device 56 includes a printhead, stamp, or other means capable of recording a specific image in an appropriate direction at a suitable position on the back 4h of the check 4 conveyed through the conveyance path 5.

Various sensors for controlling check conveyance are also disposed to the conveyance path 5. A paper length detector 61 for detecting the length of the conveyed check 4 is disposed at a position before the magnet 51. A multifeed detector 62 for detecting if checks 4 are multifed is disposed between the back contact image sensor 53 and the second conveyance roller 32. A jam detector 63 is disposed at a position before the fourth conveyance roller 34, and a paper jam resulting from the check 4 being stuck in the conveyance path 5 is detected when a check 4 is detected continuously for at least a specific time by the jam detector 63.

A printing detector 64 for detecting the presence of a check 4 to be endorsed by the recording device 56 is disposed at a position before the fifth conveyance roller 35. A discharge detector 65 is disposed at a position downstream from the sixth conveyance roller 36, that is, at the junction 9 where the conveyance path 5 branches to the first check discharge unit 7 and second check discharge unit 8, to detect discharged checks 4.

A flapper 66 that is operated by a drive motor 67 (see FIG. 4) is disposed to the junction 9. The flapper 66 selectively communicates the downstream end of the conveyance path 5 with the first check discharge unit 7 or second check discharge unit 8, and guides the check 4 into the selected discharge unit.

Figure 4:
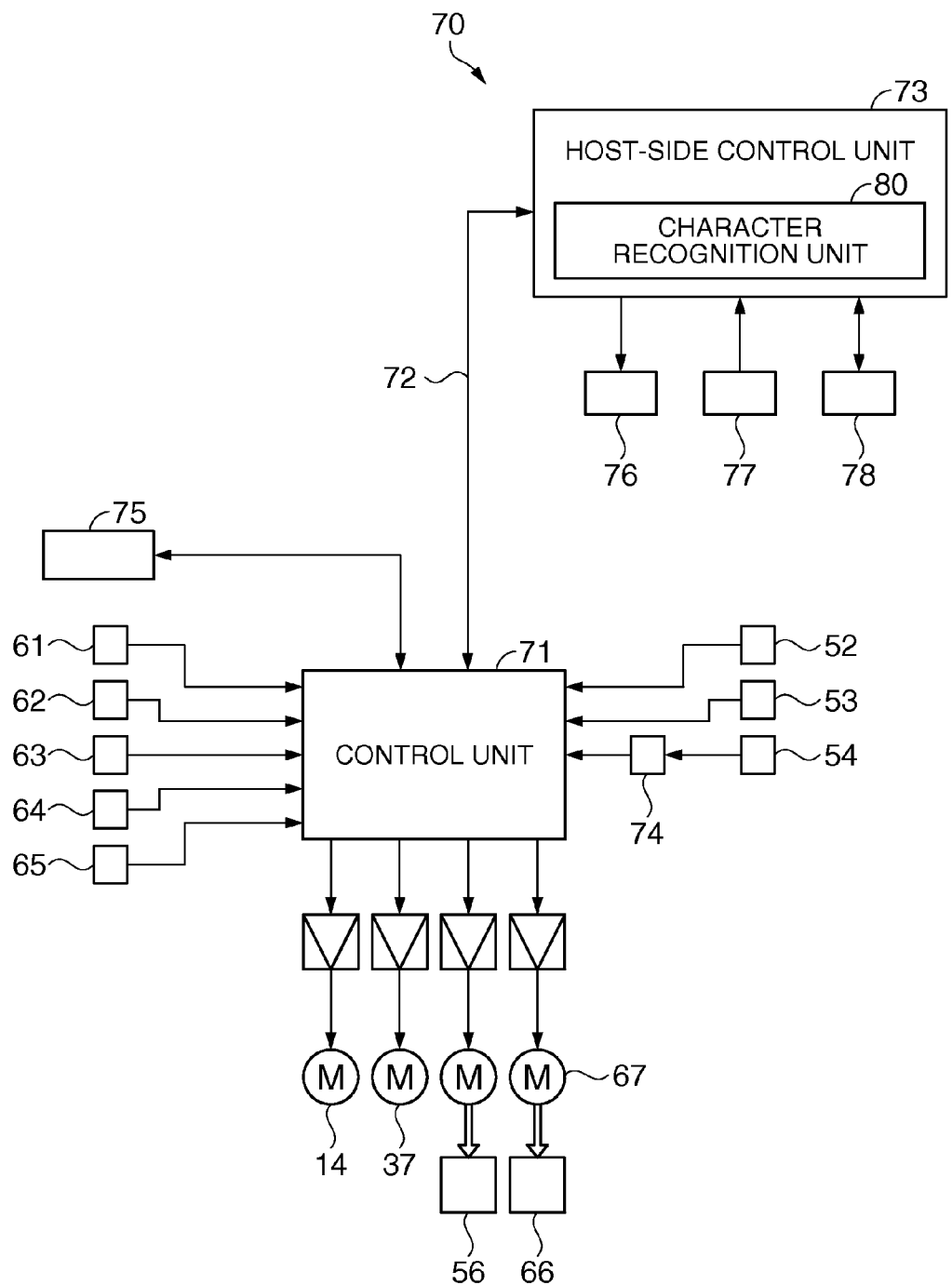
FIG. 4 is a block diagram showing the functional configuration of the check reader.

FIG. 4 is a block diagram showing the functional configuration of the check reader 1. A control unit 71 centrally controls other parts of the check reader 1 as controlled by the host-side control unit 73 of the host computer 70 described below, and includes a CPU, RAM, ROM, and other peripheral circuits.

As controlled by the host-side control unit 73, the control unit 71 drives the paper feed motor 14 and conveyance motor 37 to feed the checks 4 one at a time into the conveyance path 5 (FIG. 2), and convey the supplied check 4 through the conveyance path 5. Conveyance control of a check 4 by the control unit 71 is based on detection signals from the paper length detector 61, multifeed detector 62, jam detector 63, printing detector 64, and discharge detector 65 disposed to the conveyance path 5.

As a check 4 is conveyed, the front contact image sensor 52 and back contact image sensor 53 scan front and back images of the check 4 conveyed through the conveyance path 5, and output the image data of the captured images to the control unit 71. The control unit 71 outputs this image data to the host-side control unit 73.

The magnetic head 54 detects the electromagnetic force produced by change in the magnetic field created by the passing MICR line 100 (FIG. 1A) as controlled by the control unit 71, and outputs the resulting detection signal to a signal processing circuit 74.

The signal processing circuit 74 includes an amplifier, filter for removing noise, and A/D converter, amplifies and wave-shapes the detection signal input from the magnetic head 54, and outputs the result as data to the control unit 71. The control unit 71 sends data describing the detection signal input from the signal processing circuit 74 to the host-side control unit 73.

An operating unit 75 includes switches such as a power switch and operating switches disposed to the bottom case 2 (FIG. 2), detects user operation of these switches, and outputs to the control unit 71.

A host computer 70 is connected to the check reader 1 through a communication cable 72. The host computer 70 has a host-side control unit 73 including a CPU, RAM, ROM, and other peripheral circuits. The host-side control unit 73 includes a character recognition unit 80 described below.

Connected to the host-side control unit 73 are a display 76 for displaying information, an operating unit 77 to which input devices such as a keyboard and mouse are connected, and a storage unit 78 such as an EEPROM or hard disk device capable of storing data rewritably. The storage unit 78 stores data for the front and back images of the checks 4 input from the check reader 1, and detection signal data.

In this embodiment of the invention the control unit 71 of the check reader 1 controls parts of the check reader 1 as controlled by the host-side control unit 73 of the host computer 70. More specifically, the host-side control unit 73 controls parts of the check reader 1 by the CPU of the control unit 73 running a program stored in ROM, generating control data for controlling the control unit 71, and outputting the resulting control data to the control unit 71 of the check reader 1. The host computer 70 and check reader 1 in this embodiment of the invention thus cooperate to function as a recording media processing device for processing checks 4 as the recording medium.

Using a check 4 for a business transaction is described briefly next. The buyer of some product writes the date, payee, amount (in numbers and words), and signature in the fields 4b, 4c, 4d, 4e, 4f of the check form 4a (see FIG. 1A), and then presents the check 4 to the payee. The payee then recognizes the MICR line 100 with the check reader 1, and determines the validity of the check 4 by verifying the recognized data with a specific institution.

If check 4 validity is confirmed, endorsement information is recorded on the back of the check 4. The amount may then be printed on the endorsed check 4 in a MICR line 100 of magnetic ink characters 101 on the right by the payee, bank, or payment processing center. The check 4 is then processed through the settlement system of the bank, and the amount specified in the MICR line 100 is remitted to the endorsing payee. Reading the MICR line 100 and accurate character recognition are therefore required for check 4 processing.

Character Recognition Unit

The character recognition unit 80 of the host-side control unit 73 is described next. The function of the character recognition unit 80 is achieved by the cooperation of hardware and software, such as the CPU of the host-side control unit 73 running a program stored in ROM.

The character recognition unit 80 applies a character recognition process to each magnetic ink character 101 in the MICR line 100. Character recognition refers to identifying (recognizing) each magnetic ink character 101 in the magnetic ink characters 101 that were read, or determining that the magnetic ink character 101 cannot be identified (recognized).

If all of the magnetic ink characters 101 in the MICR line 100 can be recognized, this embodiment determines that reading the MICR line 100 succeeded. Reading the MICR line 100 fails if there is even only one magnetic ink character 101 that cannot be recognized.

In this embodiment, the MICR line 100 recorded on a check 4 is read by the magnetic head 54 as the check 4 travels through the conveyance path 5 as described above. The MICR line 100 is read by the magnetic head 54 detecting change in the magnetic flux density of the MICR line 100 on the conveyed check 4 at a specific sampling period from the right end (the right in FIG. 1A) to the left end (the left in FIG. 1A).

Figure 5A:
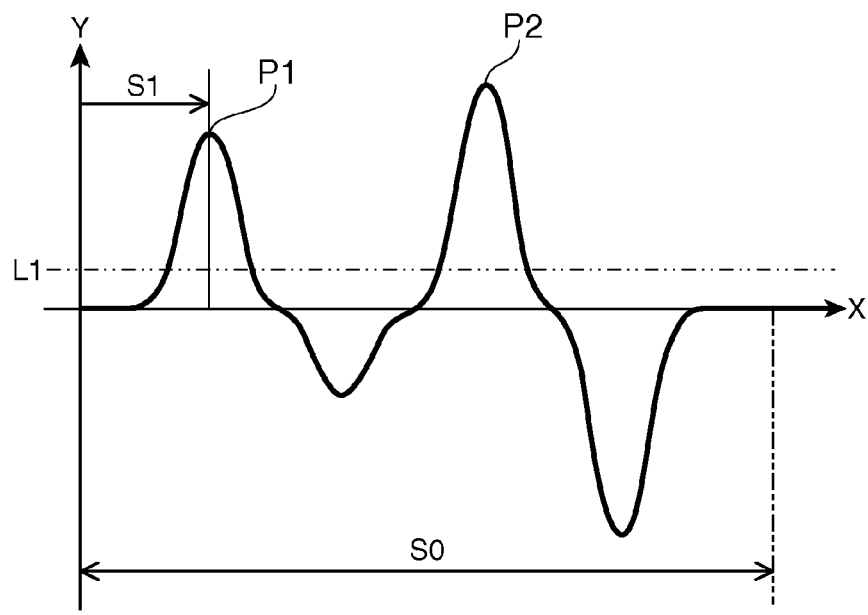
FIG. 5A and FIG. 5B show an example of character waveform data.
Figure 5B:
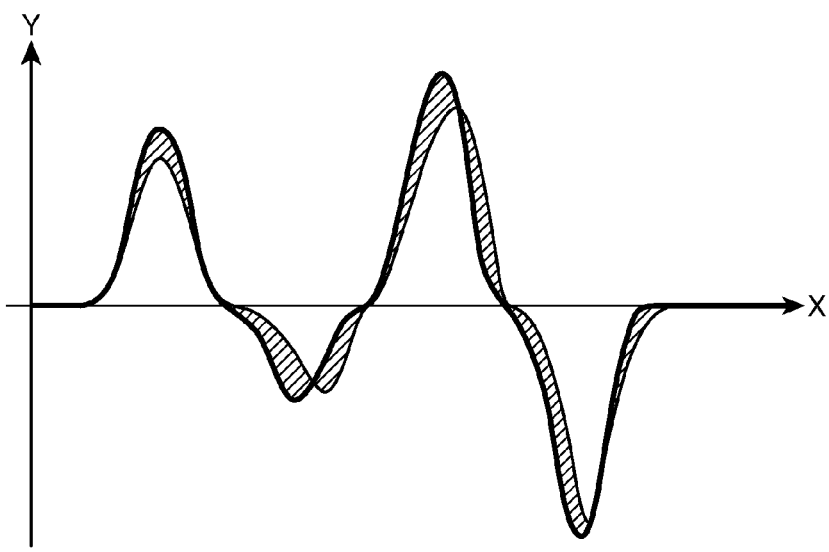

FIGS. 5A and 5B show an example of character waveform data. More specifically, FIG. 5A shows the character waveform data for one magnetic ink character, and FIG. 5B describes the difference between the character waveform data and reference waveform data. FIG. 5A and FIG. 5B show the character waveform data for the number 4 shown in FIG. 1C.

Reading with the magnetic head 54 produces a continuous waveform such as shown in FIG. 5A for one character as the signal waveform data representing one magnetic ink character in the MICR line 100. Below, the shortest interval in the sampling period is one sampling unit, and seven sampling units are referred to as one mesh.

The character recognition unit 80 applies processes including extracting and normalizing character waveform data for one character to the acquired signal waveform data. Extracting character waveform data refers to generating character waveform data such as shown in FIG. 5A for each magnetic ink character 101 in the MICR line 100 based on the signal waveform data acquired by reading the MICR line 100.

The passage of time (sampling period) is shown on the x-axis (horizontal axis) in FIG. 5A, and the sampling units pass sequentially to the right from the origin along the x-axis. The y-axis (vertical axis) shows the relative change in magnetic flux density over time, the amplitude of the character waveform data (change on the y-axis) is divided into 256 levels, and level 128 is at the origin (0 level)

Relative change in magnetic flux density during each specific sampling period is shown in FIG. 5A from the origin to the right on the x-axis (from the right side to the left side of the number 4 shown in FIG. 1C). The value on the y-axis moves up or down according to the change in the magnetic flux density of the magnetic ink character 101, and the value on the y-axis goes positive or negative according to whether the change in the magnetic flux density is positive or negative.

As shown in FIG. 5A, the period S0 on the x-axis occupied by character waveform data for one character is defined as a specific number of sampling units, and media conveyance is controlled and the length of one sampling unit is defined accordingly. Period S0 is also defined so that first peak P1, which is the first peak detected, is at specific period S1 from the start of character extraction in the character waveform data for one character.

In this embodiment the period S0 occupied by the waveform for one character is 70 sampling units (10 mesh) and the specific period S1 is 11 sampling units, for example. The character recognition unit 80 then analyzes the signal waveform data, and of the waveform peaks exceeding a specific level L1, detects the first peak P1 that appears from the origin to the end of the waveform (right on the x-axis) as the first peak.

A peak is a high or low point in the signal waveform data, and these peaks appear at a specific period along the x-axis.

Peaks on the positive side are called positive peaks, and peaks on the negative side are called negative peaks. The value on the x-axis corresponding to each peak is called the position (level) of the peak. The character waveform data of each of the 14 magnetic ink characters 101 has plural positive peaks and negative peaks.

The first peak P1 in FIG. 5A corresponds to the first stroke B1 in FIG. 1C, and the second peak P2 in FIG. 5A corresponds to the second stroke B2 in FIG. 1C.

For each magnetic ink character 101 in the MICR line 100, the character recognition unit 80 determines the start character extraction position so that the position of the detected first peak P1 is at the eleventh sampling unit on the x-axis of the extracted waveform. The character recognition unit 80 then extracts the character waveform data in the 70 sampling units (10 mesh) occupied by the waveform for one character from this start character extraction position. The magnetic ink character 101 corresponding to the character waveform data extracted for one character is referred to below as the target character.

The character recognition unit 80 then normalizes the extracted character waveform data so that the amplitude levels on the y-axis coincide with the reference waveform data for pattern matching shown by the bold line in FIG. 5B. The reference waveform data is template data for the ideal waveform resulting from the magnetic head 54 reading a magnetic ink character 101 corresponding to one of the fourteen MICR characters.

The character recognition unit 80 then recognizes each of the magnetic ink characters 101 in the MICR line 100 from the extracted character waveform data based on specific recognition conditions. The magnetic ink character 101 recognition process either identifies the magnetic ink character 101 that was read, or determines that character recognition is not possible. Character recognition is further described below.

The character recognition unit 80 then compares the normalized character waveform data indicated by the thin line in FIG. 5B with reference waveform data for each character, and detects the difference therebetween. This difference is the size of the shaded area in FIG. 5B, and more specifically is the sum of the absolute values of the y-axis value of the waveform described by the character waveform data (signal level), and the y-axis value of the waveform described by the reference waveform data.

The smaller the difference between the character waveform data for one character and the reference waveform data for the same character, the closer the resemblance between the waveform represented by the character waveform data and the waveform represented by the reference waveform data, and the greater the probability that the magnetic ink character 101 described by the character waveform data is the character described by the reference waveform data.

After calculating the difference between the character waveform data for the one character and all 14 MICR characters, the character recognition unit 80 selects the character corresponding to the reference waveform data with the smallest difference as a first candidate, and the character corresponding to the reference waveform data with the next-smallest difference as a second candidate. The character recognition unit 80 then compares the difference between the character waveform data and the reference waveform data for the characters selected as the first candidate and second candidate with threshold A as a first threshold.

If the difference between the character waveform data and the reference waveform data used as the first candidate is less than or equal to threshold A, and the difference between the character waveform data and the reference waveform data used as the second candidate is greater than threshold A, the magnetic ink character 101 is considered recognized, and the character selected as the first candidate is output as the recognized character obtained by character recognition. Note that threshold A could be a fixed value for each character, or vary according to the step in the process.

The threshold A used for magnetic recognition is set appropriately so that only the difference between the character waveform data and the reference waveform data for the correct character is less than or equal to the specific threshold, and the difference between the character waveform data and the reference waveform data for the other characters exceeds the threshold. As a result, if the difference with the first candidate exceeds the threshold A, or there are plural characters resulting in a difference less than or equal to the threshold A, an error such as a read error with the magnetic head 54 or a check 4 conveyance error may have occurred resulting in a recognition error, and recognition is determined not possible.

Figure 6:
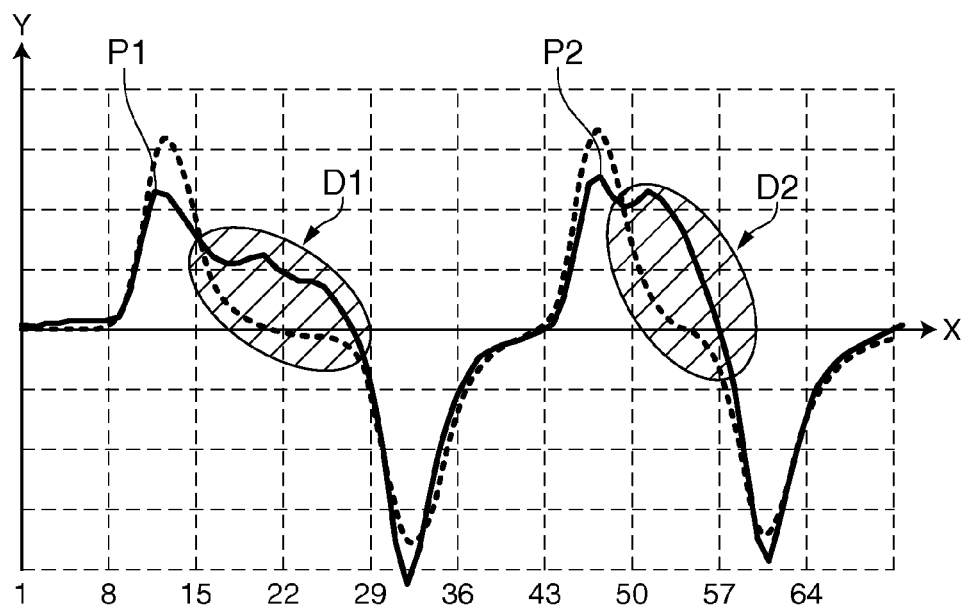
FIG. 6 shows an example of character waveform data with waveform distortion.

The waveform of the character waveform data obtained by reading the magnetic ink character 101 can be distorted in characters such as the number 4 and transit symbol T that have a stroke with a line width greater than or equal to the specific width of 2 mesh. FIG. 6 shows an example of character waveform data containing such waveform distortion. FIG. 6 shows an example of waveform distortion in the character waveform data for the transit symbol T shown in FIG. 1D. The x-axis in FIG. 6 is divided into units of 1 mesh (7 sampling units), and the numbers shown at the end of each mesh identify the coincident sampling unit.

The character waveform data indicated by the solid line in FIG. 6 is distorted compared with the reference waveform data indicated by the dotted line in FIG. 6 at the first peak P1 corresponding to the first stroke B1 in FIG. 1D and at the second peak P2 corresponding to the second stroke B2 in FIG. 1D. More specifically, the signal levels of the first peak P1 and the second peak P2 are lower than the reference waveform data, and the signal level in the area of D1 following the first peak P1 in the reading direction (right on the x-axis) and in the area of D2 following the second peak P2 is greater than the reference waveform data with the waveform rising.

When there is waveform distortion in the character waveform data (separation from the reference waveform data), the difference to the reference waveform data increases, particularly in the areas of D1 and D2. As a result, the difference between the character waveform data and the reference waveform data exceeds the threshold A during magnetic recognition, the character cannot be recognized, and the recognition rate drops. The invention improves the recognition rate even when such waveform distortion occurs by reducing the effect of waveform distortion through the correction process described below.

One cause of such waveform distortion is uneven application of the magnetic ink (referred to below as simply "uneven application"). Because the magnetic flux density usually does not change during magnetic reading in the area of a magnetic ink character 101 where the line width of a stroke does not change in the reading direction (the line width is the same in the direction perpendicular to the reading direction), as in the first stroke B1 and second stroke B2 shown in FIG. 1D, there is no change in the waveform of the acquired character waveform data.

However, if there is uneven application of the magnetic ink, the magnetic flux density varies during magnetic reading even in parts where the line width of the stroke does not change. This can result in waveform distortion, including the peak flattening and spreading or splitting into two parts as shown in D1 and D2 in FIG. 6. Waveform distortion also increases in parts where the line width of the stroke does not change but is 2 mesh or more wide. However, in strokes that are 1 mesh wide but the line width of the stroke does not change, waveform distortion is relatively small and the effect on recognition results is little.

Such waveform distortion can occur in any character having a stroke 2 mesh or more wide, including the transit symbol T, the number 1, number 4, amount symbol A, dash symbol D, and On-Us symbol O. A character with a part where the line width of a stroke does not change is 2 mesh or more wide is referred to herein as a "correction character." When the target character is a correction character, the target character is processed in the correction process described below.

The numbers 3, 8, and 9 each have a part that is 2 mesh wide, but these characters are not processed in the correction process (are not correction characters) because the line width of the stroke changes and the maximum width of the portion extending with the same line width through the vertical direction perpendicular to the reading direction is 1 mesh. However, while the line width of the stroke forming the number 1 changes in the middle, the number 1 is processed in the correction process because the part where the line width is the same through the vertical direction perpendicular to the reading direction is 2 mesh.

Character Recognition Process

Figure 7:
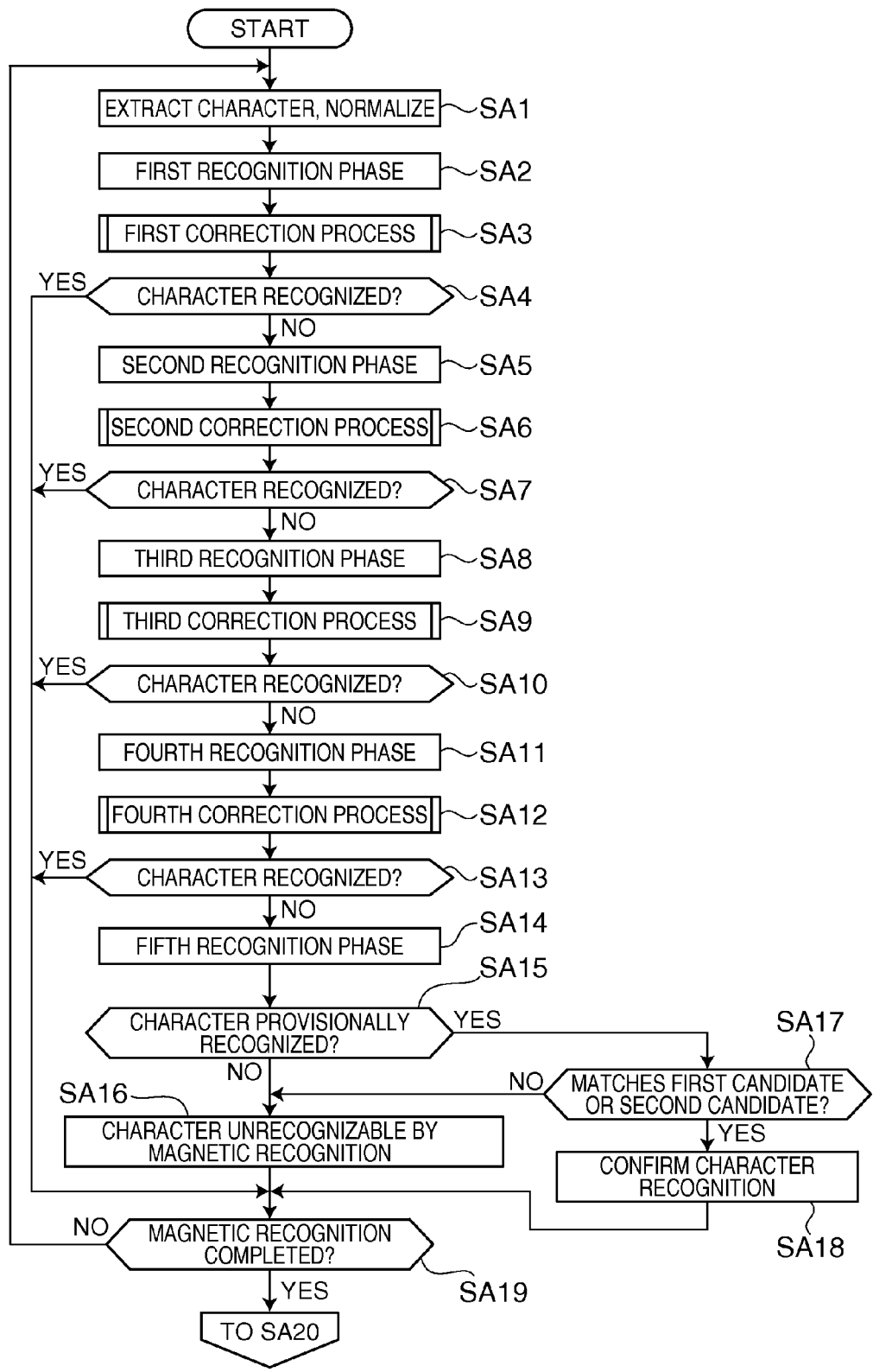
FIG. 7 is a flow chart describing the character recognition process in a check reader according to the invention.
Figure 8:
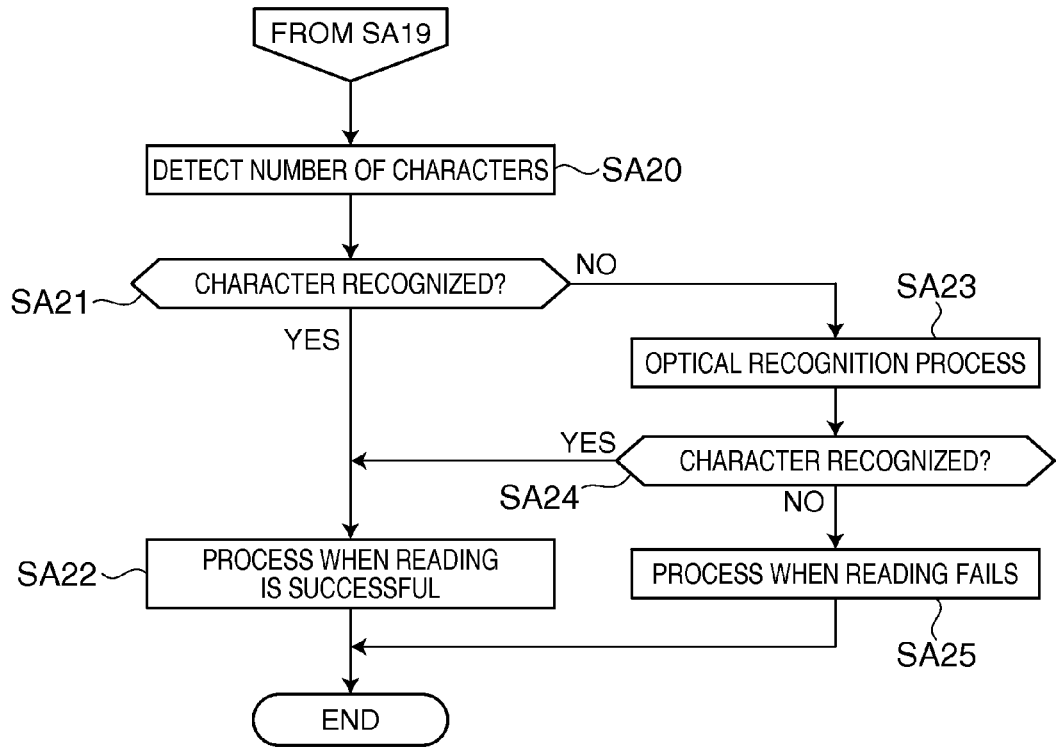
FIG. 8 is a flow chart describing the character recognition process in a check reader according to the invention.
Figure 9:
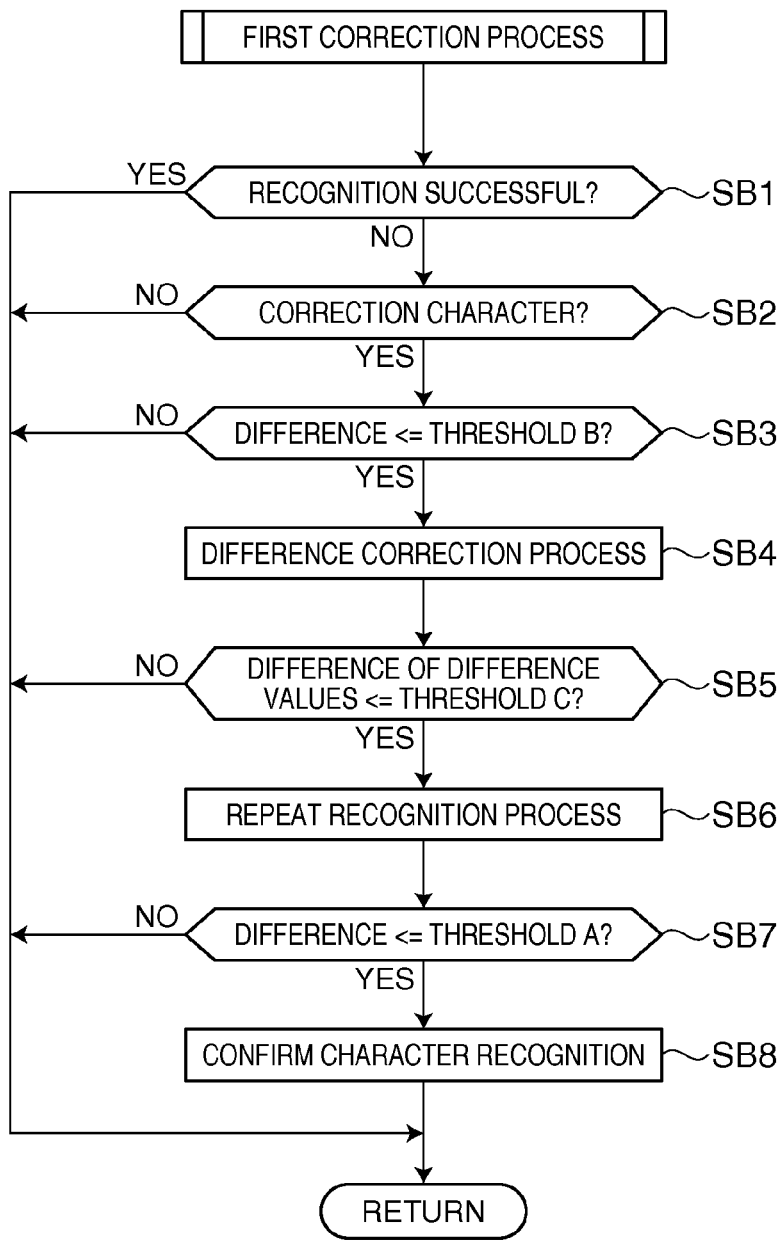
FIG. 9 is a flow chart describing the correction process in a check reader according to the invention.
Figure 10:
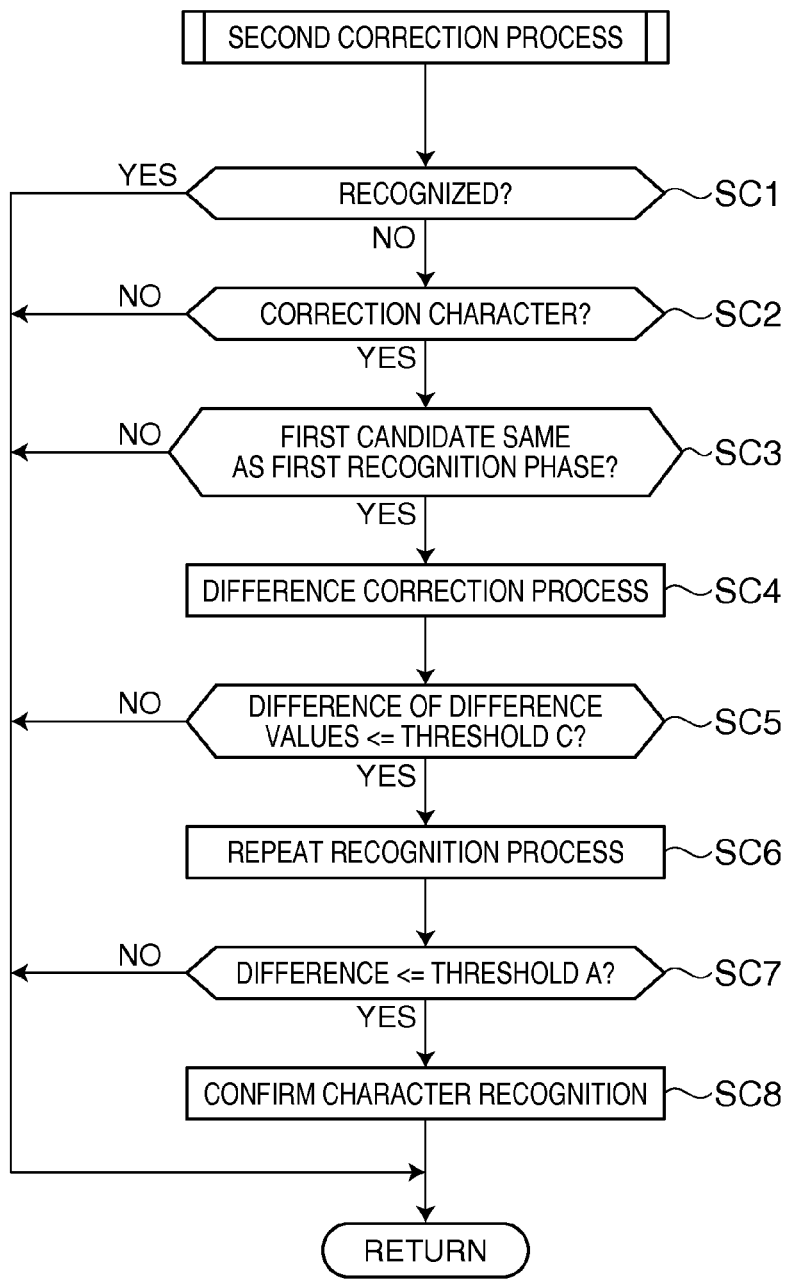
FIG. 10 is a flow chart describing the correction process in a check reader according to the invention.

The character recognition process in the check reader 1 according to this embodiment of the invention is described next. FIG. 7 and FIG. 8 are flow charts describing the character recognition process in a check reader 1 according to this embodiment. FIG. 9 and FIG. 10 are flow charts describing the correction process in the check reader 1 according to this embodiment of the invention.

The MICR line 100 recorded on the check 4 is read by the magnetic head 54 before step SA1 in FIG. 7. Signal waveform data generated by the signal processing circuit 74 amplifying, filtering, and wave-shaping the read signal is then output by the control unit 71 to the host-side control unit 73. The front contact image sensor 52 also images the front of the check 4, and the image data is output from the control unit 71 to the host-side control unit 73.

Then in step SA1, the first peak P1 (FIG. 5A) used as the reference for the start character extraction position is detected in the acquired signal waveform data. Based on the position of the detected first peak P1, the character recognition unit 80 extracts character waveform data for one character corresponding to a magnetic ink character 101 from the signal waveform data, and applies a normalization process to the extracted character waveform data.

The magnetic recognition process described from step SA2 below has five recognition phases from a first recognition phase in step SA2 to a fifth recognition phase in step SA14. These five recognition phases apply magnetic recognition to the character waveform data of the target character using different methods.

These five recognition phases are sequentially applied to the character waveform data of the target character extracted in step SA1. If the target character is successfully recognized in any of the first to fourth of the five recognition phases, the next magnetic ink character 101 is made the target character and magnetic recognition is applied to the character waveform data for the new target character without proceeding to the next phase.

If the target character cannot be recognized in these five recognition phases, the optical recognition process described below in step SA23 (FIG. 8) is applied to the target character.

As described above, the shapes of magnetic ink characters 101 printed by offset and laser printing processes may differ slightly. The reference waveform data therefore includes reference waveform data for offset printing, and reference waveform data for laser printing. This embodiment uses the reference waveform data for offset printing in the first and second recognition phases, and uses reference waveform data for laser printing in the third and fourth recognition phases.

In the first recognition phase in step SA2, the character recognition unit 80 detects the difference between the character waveform data for the target character and the reference waveform data for the 14 MICR characters by means of a simple comparison and a sliding comparison. As described above, if the difference between the character waveform data and the reference waveform data of the first candidate character is less than or equal to the threshold, and the difference between the character waveform data and the reference waveform data of the second candidate character is greater than the threshold, recognition of the target character is confirmed.

The difference that is compared with threshold A is the difference for the one target character, and is the sum of the absolute values of the differences between values in the character waveform data and values in the reference waveform data for all 10 mesh (70 sampling units). The sum of all differences for one target character is referred to below as the "total difference" for that character.

A simple comparison in the first recognition phase means simply comparing the waveform of the character waveform data for the target character with the waveform of the reference waveform data. A sliding comparison means sliding the waveform of the character waveform data for the target character and the waveform of the reference waveform data a specific distance in a specific range for comparison. If the target character is recognized as a result of the simple comparison, the first recognition phase ends without applying the sliding comparison.

Correction Process

The character recognition unit 80 performs a first correction process in step SA3 following the first recognition phase. The first correction process performed in step SA3 is described with reference to FIG. 9.

In step SB1 in FIG. 9, the character recognition unit 80 determines if the target character was recognized in the first recognition phase in step SA2. If the target character was recognized (step SB1 returns YES), the character recognition unit 80 skips step SB2 to SB8 and goes to step SA4 (FIG. 7) because the character was recognized. If the target character was not recognized (step SB1 returns NO), the character recognition unit 80 goes to step SB2.

In step SB2, the character recognition unit 80 determines if the character used as the first candidate (first candidate character) for the target character in the first recognition phase in step SA2 is a correction character, that is, the number 1, number 4, transit symbol T, amount symbol A, dash symbol D, or On-Us symbol O. If the first candidate character is a correction character (step SB2 returns YES), the character recognition unit 80 goes to step SB3. If the first candidate character is not a correction character (step SB2 returns NO), the character recognition unit 80 goes to step SB4.

Step SB3 determines if the total difference between the character waveform data for the target character acquired in the first recognition phase and the reference waveform data of the first candidate character is less than or equal to a threshold B set as a second threshold. If the total difference is less than or equal to threshold B, the correction process of step SB4 is executed. The threshold B used in step SB3 differs according to the character used as the first candidate character in the first recognition phase of step SA2. This threshold B is threshold A in the first recognition phase plus a specific value C that is set for each character used as the first candidate.

Threshold B is set for each character used as the first candidate (a specific value C is set for each character used as the first candidate) because the possibility of a recognition error is actually increased if the correction process for reducing the effect of waveform distortion is applied when the target character is mistakenly determined to be the transit symbol T, for example, in the first recognition phase even though the target character is actually a different character.

The correction process in step SB4 reduces the effect of waveform distortion when waveform distortion occurs due to uneven application of magnetic ink in a character with a stroke width of 2 mesh or more. As a result, executing the correction process when the total difference in the recognition phase is significantly greater than the difference created by the effect of uneven application of magnetic ink may actually increase the possibility of a recognition error even though the character can be recognized. The recognition rate is therefore improved by setting threshold B (specific value C) according to the line width of strokes in each character, and executing the correction process only when the target character is recognized with a certain degree of accuracy.

In this embodiment the specific value C is, for example, 672 when the first candidate character for the target character is the transit symbol T, 448 when the first candidate character is the number 4, amount symbol A, dash symbol D, or On-Us symbol O, and 224 when the first candidate character is the number 1. The concept and method of setting the specific value C to these values is described below.

In the character waveform data for the transit symbol T shown in FIG. 6, areas D1 and D2 are where the difference to the reference waveform data is great due particularly to the effect of waveform distortion. How the size of the difference in areas D1 and D2 changes relative to the width of parts where the line width of the stroke does not change is considered below.

Areas D1 and D2 are first approximated as rectangles. When the width of the part where the line width of the stroke does not change is 3 mesh as in the first stroke B1 of the transit symbol T in FIG. 1D, the length of the bottom of the approximate rectangle (the length on the x-axis) is approximately 1 mesh (7 sampling units). The height of the rectangle (length on the y-axis) is approximately half the maximum variation of the character waveform data above and below the x-axis, that is, 128/2=64. The area of the rectangle is therefore 7×64=448.

When the width of a part where the line width of the stroke does not change is 2 mesh as in the second stroke B2 of the transit symbol T in FIG. 1D, the length of the bottom of the approximate rectangle is approximately 0.5 mesh (3.5 sampling units). The height of the rectangle is the same as when the width of the part where the line width does not change is 3 mesh, that is, 64. The area of the rectangle is therefore 3.5×64=224.

The degree of waveform distortion on the y-axis could be greater than the value of 64 used above. However, because the threshold A used in each recognition phase is set to include some degree of deviation, the height of the rectangle is set to approximately ½ of the maximum variation (128) on the y-axis.

The specific value C is then calculated for the correction character from the total area of the rectangles corresponding to strokes that are 2 mesh or more wide in each character based on the areas of the rectangles when the width of the part where the line width of the stroke does not change is 3 mesh and when the width is 2 mesh.

Because the transit symbol T has a first stroke B1 that is 3 mesh wide and a second stroke B2 that is 2 mesh wide, the specific value C for the transit symbol T is 448+224=672. The number 4 has a 2-mesh wide first stroke B1 and a 2-mesh wide second stroke B2, and the specific value C for the number 4 is therefore 224×2=448. The specific value C of the amount symbol A, dash symbol D, and On-Us symbol O is likewise 224×2=448. For the number 1, the specific value C is 224×1=224 because there is only one 2-mesh wide part where the line width of the stroke does not change.

The threshold B for each correction character is then calculated by adding this specific value C to the threshold A used in the first recognition phase.

If the total difference is less than or equal to threshold B in step SB3 (step SB3 returns YES), the character recognition unit 80 goes to step SB4. If the total difference is greater than threshold B (step SB3 returns NO), the character recognition unit 80 goes to step SA4.

Step SB4 applies a process to correct the difference between the character waveform data of the target character and the reference waveform data of the first candidate character in the first recognition phase. The difference correction process is applied to a target area in part of the character waveform data based on the first candidate character. The difference correction process executed in step SB4 is described below.

FIG. 11 shows the target area of the difference correction process. FIG. 11 shows the target area of the difference correction process in first to fourth correction processes. The target area is the area (sampling units) to which the difference correction process is applied in the 70 sampling unit (10 mesh) area of one character on the x-axis in the character waveform data.

The difference in this area of part of the character waveform data is called the "partial difference" and is differentiated from the total difference, which is the sum of the differences in all 10 mesh (70 sampling units) of one character. The partial difference in the target area shown in FIG. 11 is called the "target partial difference." The target partial difference is the sum of the absolute values of the difference between the character waveform data and the reference waveform data in the target areas in all 10 mesh. The total difference minus the target partial difference is the difference in the area not including the target area, and below is called the non-target partial difference.

For example, in the first correction process and second correction process of the transit symbol T, the target areas of the correction process are from sampling unit 16 in the character waveform data to sampling unit 29, and from sampling unit 51 to sampling unit 57. The area in the transit symbol T from sampling unit 16 to sampling unit 29 corresponds to area D1 in FIG. 6 and first stroke B1 in FIG. 1D. The area from sampling unit 51 to sampling unit 57 corresponds to area D2 in FIG. 6 and second stroke B2 in FIG. 1D.

The number 4, transit symbol T, amount symbol A, and dash symbol D each have two strokes that are 2 mesh or more wide, and two target areas corresponding to these strokes are therefore defined for these characters as shown in FIG. 11. The number 1 and On-Us symbol O each have one stroke that is 2 mesh or more wide, and therefore have one target area.

As described above, the shapes of the printed magnetic ink characters 101 may differ according to whether an offset printing or laser printing process was used. The target areas of the correction process therefore differ in the first correction process and second correction process that are applied after the first recognition phase and second recognition phase using reference waveform data for offset printing, and the third correction process and fourth correction process that are applied after the third recognition phase and fourth recognition phase using reference waveform data for laser printing.

For example, for the transit symbol T, the target areas of the correction process in the third correction process and fourth correction process are from sampling unit 16 to sampling unit 28 in the character waveform data, and from sampling unit 52 to sampling unit 56.

The correction process in step SB4 is executed only when the value of the character waveform data at each sampling unit is positive (above the x-axis on the y-axis in FIG. 6) and is greater than (on the positive side) the value of the reference waveform data. When this is true, the target partial difference is calculated, and the target partial difference before the correction process (below, target partial difference a) is determined based on the total difference of the target character acquired in the first recognition phase. The product of the target partial difference a before the correction process multiplied by a coefficient c is then calculated to get the target partial difference after the correction process (below, target partial difference b). More specifically, target partial difference b=target partial difference a times coefficient c.

Coefficient c is set according to the degree of waveform distortion, and is typically from 0 to ½, for example. Before the correction process (after the first recognition phase), the difference between the character waveform data and the reference waveform data due to waveform distortion is presumed to be greater than normal, particularly in the target area. The target partial difference a is therefore multiplied by the coefficient c to reduce the difference in the target area and thereby reduce the effect of waveform distortion and improve the recognition rate. The possibility of being able to recognize the target character increases if the coefficient c is 0, but the possibility of mistakenly recognizing the character as a different character also increases, and some degree of difference is therefore preferably left.

The correction process in step SB4 substitutes the target partial difference b after the correction process for the target partial difference a of the target area in the total difference of the target character. The total difference therefore changes before and after the correction process as follows.

Before Correction Process $$\text{total difference} = \text{target partial difference } a + \text{non-target partial difference}$$

After Correction Process $$\text{total difference} = \text{target partial difference } b + \text{non-target partial difference} = (\text{target partial difference } a \times \text{coefficient } c) + \text{non-target partial difference}$$

In step SB5 the character recognition unit 80 determines if the difference of the total difference before and after the correction process, that is, the difference between target partial difference a and target partial difference b, is less than or equal to the specific value C. If the difference between target partial difference a and target partial difference b is less than or equal to the specific value C (step SB5 returns YES), the character recognition unit 80 goes to step SB6. If the difference between target partial difference a and target partial difference b is greater than the specific value C (step SB5 returns NO), the character recognition unit 80 goes to step SA4.

When the difference between target partial difference a and target partial difference b is greater than the specific value C in step SB5, the recognition process is not repeated after the correction process in step SB6.

When the total difference after the correction process is significantly less than before the correction process, there is a strong possibility that the target character is not a correction character but the first candidate character was erroneously recognized as one of the correction characters. If the correction process is applied in this event, the total difference will become less than the actual difference, resulting in a recognition error. Recognition errors are suppressed in this event by not repeating the recognition process.

The character recognition unit 80 recognizes the target character again in step SB6 based on the total difference after the correction process. The total difference after the correction process (target partial difference b+non-target partial difference) is compared with threshold A in step SB6. Recognition in step SB6 considers only the first candidate character in the first recognition phase, and does not recognize the second candidate character.

Whether the total difference after the correction process is less than or equal to threshold A is determined in step SB7. In the steps up to step SB7, the possibility that the first candidate of the target character is a correction character is considered high, and if the total difference after the correction process is not significantly smaller than before the correction process, and the total difference is less than or equal to threshold A as a result of re-recognition, the possibility is high that the character used as the first candidate was correctly recognized.

Therefore, if the total difference after the correction process is less than or equal to threshold A (step SB7 returns YES), the character recognition unit 80 goes to step SB8. Recognition of the target character is confirmed in step SB8. However, if the total difference after the correction process exceeds threshold A (step SB7 returns NO), the character could not be recognized even after the correction process was applied, and the character recognition unit 80 goes to step SA4. This completes the first correction process of step SA3.

In step SA4 in FIG. 7, the character recognition unit 80 determines if recognition of the target character was confirmed in the first recognition phase of step SA2 and the first correction process of step SA3. If the target character was recognized (step SA4 returns YES), the character recognition unit 80 skips the second recognition phase and goes to step SA19. If the target character could not be recognized (step SA4 returns NO), the character recognition unit 80 executes the second recognition phase in step SA5.

In the second recognition phase in step SA5, the character recognition unit 80 scales the waveform of the reference waveform data for the character being compared a specific amount (sampling units) in a specific range, and detects the total difference between the corrected reference waveform data and the waveform of the character waveform data for the target character.

In the second recognition phase of step SA5, if the total difference between the character waveform data and the reference waveform data of the first candidate is less than or equal to threshold A, and the total difference between the character waveform data and the reference waveform data of the second candidate is greater than the threshold A, the character recognition unit 80 determines that the target character was recognized.

Second Correction Process

The character recognition unit 80 executes the second correction process in step SA6 following the second recognition phase. The second correction process of step SA6 is described with reference to FIG. 10. The condition for determining whether to apply the second correction process in step SA6 to the target character differs from the condition used in the first correction process in step SA3.

In step SC1 shown in FIG. 10, the character recognition unit 80 determines if the target character was recognized in the second recognition phase in step SA5. If the target character was recognized (step SC1 returns YES), the character recognition unit 80 skips step SC2 and goes to step SA7 (FIG. 7) because the character was confirmed. If the target character could not be recognized (step SC1 returns NO), the character recognition unit 80 goes to step SC2.

In step SC2, the character recognition unit 80 determines if the character used as the first candidate of the target character in the second recognition phase in step SA5 is a correction character. If the first candidate character of the target character is a correction character (step SC2 returns YES), the character recognition unit 80 goes to step SC3. If the first candidate character of the target character is not a correction character (step SC2 returns NO), the character recognition unit 80 goes to step SA7.

In step SC3, the character recognition unit 80 determines if the first candidate character in the second recognition phase matches the first candidate character in the first recognition phase. If the first candidate character in the second recognition phase matches the first candidate character in the first recognition phase (step SC3 returns YES), the character recognition unit 80 goes to step SC4. If the first candidate character in the second recognition phase does not match the first candidate character in the first recognition phase, the correction process is skipped and the character recognition unit 80 goes to step SA7.

In step SC3 the character recognition unit 80 uses the recognition result from the first recognition phase, and does not determine if the total difference is less than or equal to threshold B as in step SB3. If the same character is used as the first candidate in the first recognition phase and second recognition phase and that character is a correction character, there is a strong possibility that the target character was correctly recognized. In this event the second correction process works to improve the recognition rate.

In step SC4, the character recognition unit 80 corrects the difference between the character waveform data of the target character and the reference waveform data of the character used as the first candidate in the second recognition phase. The operation of step SC4 is the same as step SB4 in the first correction process, and further description thereof is omitted.

As in step SB5, in step SC5 the character recognition unit 80 determines if the difference between target partial difference a and target partial difference b is less than or equal to a specific value C. If the difference between the two values is less than or equal to the specific value C (step SC5 returns YES), the character recognition unit 80 goes to step SC6. If the difference is greater than the specific value C (step SC5 returns NO), the character recognition unit 80 goes to step SA7. Note that the specific value C is the value calculated in the first correction process (step SB3).

In step SC6 the character recognition unit 80 applies the recognition process to the target character again based on the total difference after the correction process.

Whether the total difference after the correction process is less than or equal to threshold A is determined in step SC7. If the total difference after the correction process is less than or equal to threshold A (step SC7 returns YES), the character recognition unit 80 goes to step SC8. Recognition of the target character is confirmed in step SC8.

However, if the total difference after the correction process exceeds threshold A (step SC7 returns NO), the character could not be recognized even after the correction process was applied, and the character recognition unit 80 goes to step SA7. This completes the second correction process of step SA6.

In the next step SA7, the character recognition unit 80 determines if the target character was recognized in the second recognition phase in step SA5 and the second correction process in step SA6. If the target character was recognized (step SA7 returns YES), the character recognition unit 80 skips the third recognition phase and goes directly to step SA19. If the target character was not recognized (step SA7 returns NO), the character recognition unit 80 executes the third recognition phase in step SA8.

The third recognition phase in step SA8 uses the reference waveform data for laser printing, the operation is the same as in the first recognition phase of step SA2, and further description thereof is thus omitted.

The character recognition unit 80 executes the third correction process in step SA9 following the third recognition phase. The third correction process in step SA9 uses the recognition result of the third recognition phase to perform the same operations as the steps of the first correction process shown in FIG. 9, and further description thereof is omitted. As shown in FIG. 11, however, the target area to which the correction process is applied in the third correction process in step SA9 differs from the target areas in the first correction process and second correction process.

In the next step SA10, the character recognition unit 80 determines if the target character was recognized in the third recognition phase in step SA8 and the third correction process in step SA9. If the target character was recognized (step SA10 returns YES), the character recognition unit 80 skips the fourth recognition phase and goes to step SA19. If the target character was not recognized (step SA10 returns NO), the character recognition unit 80 executes the fourth recognition phase in step SA11.

The reference waveform data for laser printing is used in the fourth recognition phase in step SA11, operation is the same as in the second recognition phase in step SA5, and further description thereof is thus omitted.

In step SA12 following the fourth recognition phase, the character recognition unit 80 executes the fourth correction process. The fourth correction process in step SA12 uses the recognition result of the fourth recognition phase to perform the same operations as the steps of the second correction process shown in FIG. 10, and further description thereof is omitted. As shown in FIG. 11, however, the target area to which the correction process is applied in the fourth correction process in step SA12 differs from the target areas in the first correction process and second correction process.

In the next step SA13, the character recognition unit 80 determines if the target character was recognized in the fourth recognition phase in step SA11 and the fourth correction process in step SA12. If the target character was recognized (step SA13 returns YES), the character recognition unit 80 skips the fifth recognition phase and goes to step SA19. If the target character was not recognized (step SA13 returns NO), the character recognition unit 80 executes the fifth recognition phase in step SA14.

Instead of comparing all sampling units, the fifth recognition phase in step SA14 compares the waveform of the target character waveform data and the waveform of the reference waveform data at the positions of the peaks and the sampling units therebefore and after in the reference waveform data. This eliminates the effect of distortion of the waveform of the character waveform data of the target character, and enables recognizing the target character with consideration for stretching, compression, and shifting in parts of the waveform.

The fifth recognition phase does not confirm recognition of the target character as in the other recognition phases, and recognition of the target character is confirmed only if a specific condition is met as described below. Confirmation of target character recognition in the fifth recognition phase is therefore referred to as "provisional confirmation" below. This is because while the other recognition phases recognize magnetic ink characters using the total difference in all sampling units, the fifth recognition phase recognizes magnetic ink characters using the results of comparing the waveform of the character waveform data and the waveform of the reference waveform data in specific sampling units.

In the next step SA15, the character recognition unit 80 determines if the target character was provisionally recognized in the fifth recognition phase. If recognition of the target character was not provisionally confirmed (step SA15 returns NO), that is, if the target character could not be recognized in any of the first to fifth recognition phases, the character recognition unit 80 determines that the target character cannot be recognized by magnetic recognition (step SA16), and goes to step SA19.

If recognition of the target character is provisionally confirmed in the fifth recognition phase (step SA15 returns YES), the character recognition unit 80 determines if there is a match between the character provisionally recognized in the fifth recognition phase and the character used as the first or second candidate character in the preceding recognition phases (step SA17). Whether there is a match between the character provisionally recognized in the fifth recognition phase and either the first or second candidate character in the second recognition phase is determined in this example.

If the characters do not match (step SA17 returns NO), the character recognition unit 80 determines that the target character cannot be recognized by magnetic recognition (step SA16), and goes to step SA19. If there is a match (step SA17 returns YES), the character recognition unit 80 confirms that the target character is the character that was provisionally recognized in the fifth recognition phase (step SA18), and goes to step SA19.

In step SA19, the character recognition unit 80 determines if the magnetic recognition process was completed, that is, if all magnetic ink characters 101 in the MICR line 100 were processed as the target character. If the magnetic recognition process was completed (step SA19 returns YES), the character recognition unit 80 goes to step SA20 in FIG. 8. If the magnetic recognition process is not completed (step SA19 returns NO), the character recognition unit 80 returns to step SA1 and magnetically recognizes the next target character.

In step SA20 in FIG. 8, the character recognition unit 80 detects the number of characters in the recognition string. In step SA21, the character recognition unit 80 determines if all characters contained in the recognition string, that is, all magnetic ink characters 101 in the MICR line 100, were recognized.

If all characters were recognized (step SA21 returns YES), the host-side control unit 73 determines that reading the MICR line 100 was successful and in step SA22 executes the process that is performed when the MICR line 100 is successfully read. The process performed when the MICR line 100 is successfully read includes, for example, storing the information indicated by the MICR line 100 in a storage unit, recording a specific endorsement image on the back of the check 4 with a printer or other recording device, and discharging the check 4 from the check reader 1.

However, if there is even only one character in the recognition string that could not be recognized (step SA21 returns NO), the character recognition unit 80 executes the optical recognition process in step SA23 to optically recognize target characters not recognized by magnetic recognition.

In the optical recognition process of step SA23, the character recognition unit 80 identifies the range of data corresponding to an image of the MICR line 100 in the data for the image of the check 4 front captured by the front contact image sensor 52, and extracts image data for each magnetic ink character 101. The character recognition unit 80 then optically recognizes the characters by comparing bitmap patterns for each of the 14 MICR characters with the extracted image data, and recognizes each of the magnetic ink characters 101.

The optical recognition process in step SA23 may recognize a target character that was not recognized in the magnetic recognition process based on the result of optical recognition, or provisionally recognize the character based on the result of optical recognition and confirm recognition if the provisionally recognized character matches the first candidate or second candidate used in the magnetic recognition process.

In step SA24, the character recognition unit 80 determines if all magnetic ink characters 101 that were not recognized by magnetic recognition were recognized by the optical recognition process in step SA23. If all magnetic ink characters 101 are recognized (step SA24 returns YES), the character recognition unit 80 executes the operation performed in step SA22 when the MICR line 100 is successfully read.

However, if there is even only one magnetic ink character that could not be recognized (step SA24 returns NO), the host-side control unit 73 executes the operation performed in step SA25 when reading the MICR line 100 fails. The operation performed in step SA25 when reading the MICR line 100 fails discharges the check 4 without printing an endorsement image, for example. The discharged check 4 is then examined to determine why reading failed, or is read again, for example.

The character recognition process of the check reader 1 according to this embodiment of the invention ends as described above.

The effect of a recording media processing device, control method of a recording media processing device, and program according to the invention as described above is described below.

(1) When the magnetic ink character 101 of the candidate character has a stroke that is 2 mesh or more wide, the correction process reduces the partial difference of the target area corresponding to the 2 mesh or wider stroke in the total difference to the candidate character. As a result, when waveform distortion results in the character waveform data acquired from the target area due to an effect of printing, and the difference between the character waveform data and the reference waveform data is greater than normal, the increased total difference can be decreased and the effect of waveform distortion can be reduced. Because the candidate character is recognized as the magnetic ink character 101 when the total difference after the correction process is less than or equal to threshold A, the effect of waveform distortion on character recognition can be reduced and the recognition rate improved.

(2) When the value of the character waveform data in the target area is positive and is greater than the corresponding value of the reference waveform data for the candidate character, there is a strong possibility that the value of the character waveform data is greater than normal due to waveform distortion. Because the correction process is executed in this event, the recognition rate can be improved.

(3) When the total difference is significantly greater than normal, the difference between the character waveform data and the reference waveform data may be great and the possibility low that recognition will be possible even after the correction process is applied. If the correction process is executed in this event, the target character could be erroneously recognized as a different character. Because the check reader 1 compares the total difference before the correction process with a threshold B, and executes the correction process when the total difference exceeds the threshold B, executing the correction process when improving the recognition rate cannot be expected can be suppressed.

(4) The possibility of recognizing the target character can be increased if the total difference is reduced in the correction process, but this also increases the possibility that the target character will be recognized as a different character. The check reader 1 prevents the total difference from becoming too small by setting the partial difference in the target area to ½ the difference before correction, and can therefore improve the recognition rate and reduce recognition errors.

(5) The total difference will become too small if the correction process is executed when recognition is not affected by waveform distortion. Therefore, if the total difference after the correction process is significantly smaller than before the correction process, there is a strong possibility that the candidate character is incorrect. The check reader 1 does not compare the total difference with threshold A, that is, ends the recognition phase, when the difference between the total difference before the correction process and the total difference after the correction process exceeds a specific value C, and can therefore suppress recognition errors.

(6) The threshold B for determining whether or not to execute the correction process is the sum of the threshold A for character recognition plus the specific value C for comparing the total difference after the correction process with threshold A, and whether or not to execute the correction process can therefore be appropriately determined by setting specific value C appropriately.

A preferred embodiment of the invention is described above, but the invention is not limited thereto and can obviously be modified and adapted as desired within the scope of the invention.

For example, the magnetic recognition process has five magnetic recognition phases in the embodiment described above, but the invention is not so limited. The magnetic recognition process does not need to include all magnetic recognition phases, and embodiments having only the first recognition phase and second recognition phase, or only the third recognition phase and fourth recognition phase, are conceivable. The recognition phases can be selectively applied based on the type of magnetic ink or the recognition rate of the magnetic recognition process, for example.

The foregoing embodiment includes an optical recognition process, but the invention is not so limited. The optical recognition process may be omitted when a desired recognition rate is achieved in the magnetic recognition phase.

The functions of parts of the check reader 1 and the control method of the check reader 1 described in the foregoing embodiment can also be achieved by storing all or part of the foregoing program on a hard disk, optical disc, magneto-optical disc, floppy disk, Compact Disc, flash ROM, or other storage medium, and installing the program therefrom to a personal computer, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording media processing device comprising:
a magnetic reading unit that magnetically reads a magnetic ink character recorded on a recording medium; and
a character recognition unit that recognizes the read magnetic ink character based on a comparison of reference waveform data and character waveform data acquired by the magnetic reading unit reading the magnetic ink character,
the character recognition unit calculating a total difference for each character by summing the differences between the character waveform data and the reference waveform data for each magnetic ink character within the area of one character, and selecting the character with the smallest total difference as a candidate character for the read magnetic ink character,
calculating a partial difference by calculating the sum of differences between the character waveform data and the reference waveform data in a target area within the area of one character, the target area corresponding to the stroke of the specific width or more in the magnetic ink character corresponding to the candidate character, and executing a correction process that reduces the partial difference portion of the total difference to the candidate character to less than the calculated value, when the magnetic ink character corresponding to the candidate character includes a stroke of a specific width or more, and
when the total difference after the correction process is less than or equal to a first threshold, recognizing the candidate character as the character represented by the magnetic ink character that was read.

2. The recording media processing device described in claim 1, wherein:
the character recognition unit executes the correction process when a value of the character waveform data in the target area is positive and is greater than the corresponding value of the reference waveform data for the candidate character.

3. The recording media processing device described in claim 1, wherein:
the character recognition unit executes the correction process when the total difference before the correction process is less than or equal to a second threshold.

4. The recording media processing device described in claim 1, wherein:
the character recognition unit replaces the value of the calculated partial difference with the product of the calculated partial difference times ½ in the correction process.

5. The recording media processing device described in claim 1, wherein:
the character recognition unit compares the total difference after the correction process with the first threshold when the difference between the total difference before the correction process and the total difference after the correction process is less than or equal to a specific value.

6. The recording media processing device described in claim 3, wherein:
the second threshold is the sum of the first threshold and the specific value.

7. A control method of a recording media processing device including a magnetic reading unit that magnetically reads a magnetic ink character recorded on a recording medium, and a character recognition unit that recognizes the read magnetic ink character based on a comparison of reference waveform data and character waveform data acquired by the magnetic reading unit reading the magnetic ink character, the control method comprising steps of:
calculating a total difference for each character by summing the differences between the character waveform data and the reference waveform data for each magnetic ink character within the area of one character, and selecting the character with the smallest total difference as a candidate character for the read magnetic ink character;

calculating a partial difference by calculating the sum of differences between the character waveform data and the reference waveform data in a target area within the area of one character, the target area corresponding to the stroke of the specific width or more in the magnetic ink character corresponding to the candidate character, and executing a correction process that reduces the partial difference portion of the total difference to the candidate character to less than the calculated value, when the magnetic ink character corresponding to the candidate character includes a stroke of a specific width or more; and recognizing the candidate character as the character represented by the magnetic ink character that was read when the total difference after the correction process is less than or equal to a first threshold.

8. The control method of a recording media processing device described in claim 7, further comprising a step of:

executing the correction process when a value of the character waveform data is positive and is greater than the corresponding value of the reference waveform data for the candidate character in the target area.

9. The control method of a recording media processing device described in claim 7, further comprising a step of:

executing the correction process when the total difference before the correction process is less than or equal to a second threshold.

10. The control method of a recording media processing device described in claim 7, further comprising a step of:

replacing the value of the calculated partial difference with the product of the calculated partial difference times ½ in the correction process.

11. The control method of a recording media processing device described in claim 7, further comprising a step of:

comparing the total difference after the correction process with the first threshold when the difference between the total difference before the correction process and the total difference after the correction process is less than or equal to a specific value.

12. A non-transitory computer-readable storage medium storing a program executed by a control unit that controls parts of a recording media processing device including a magnetic reading unit that magnetically reads a magnetic ink character recorded on a recording medium, and a character recognition unit that recognizes the read magnetic ink character based on a comparison of reference waveform data and character waveform data acquired by the magnetic reading unit reading the magnetic ink character, the program causing the control unit to execute steps of:

calculating a total difference for each character by summing the differences between the character waveform data and the reference waveform data for each magnetic ink character within the area of one character, and selecting the character with the smallest total difference as a candidate character for the read magnetic ink character;

calculating a partial difference by calculating the sum of differences between the character waveform data and the reference waveform data in a target area within the area of one character, the target area corresponding to the stroke of the specific width or more in the magnetic ink character corresponding to the candidate character, and executing a correction process that reduces the partial difference portion of the total difference to the candidate character to less than the calculated value, when the magnetic ink character corresponding to the candidate character includes a stroke of a specific width or more; and recognizing the candidate character as the character represented by the magnetic ink character that was read when the total difference after the correction process is less than or equal to a first threshold.

* * * * *